UNITED STATES PATENT OFFICE.

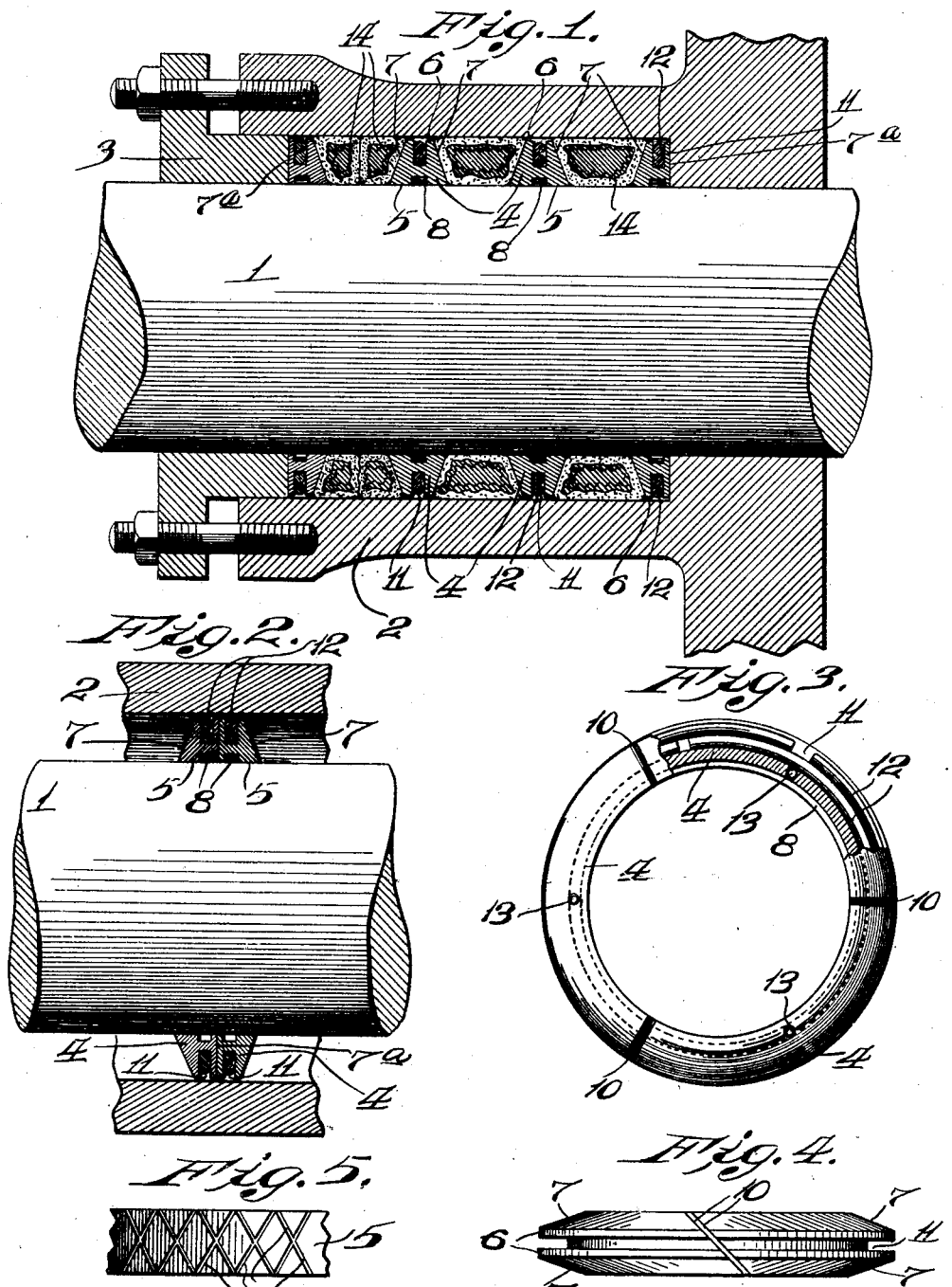

AUGUST H. FRANKE, OF ST. LOUIS, MISSOURI.

SMOOTHING AND TRUING RING FOR STUFFING-BOXES.

No. 924,755.        Specification of Letters Patent.        Patented June 15, 1909.

Application filed October 30, 1903.    Serial No. 460,247.

*To all whom it may concern:*

Be it known that I, AUGUST H. FRANKE, a citizen of the United States, and resident of St. Louis, Missouri, have invented certain new and useful Improvements in Smoothing and Truing Rings for Stuffing-Boxes, of which the following is a specification containing a full, clear, and exact description, reference being had to the accompanying drawings, forming a part hereof.

My invention relates to smoothing and truing rings for piston rods, reciprocating shafts and the like, the object of my invention being to provide a series of sectional metal rings to be used in connection with flexible packing rings in a stuffing box or the like, which metal rings serve to smooth and true up the surface of the piston rod or reciprocating shaft operating through the stuffing box, and which metal rings co-act with the flexible packing rings to form a perfect packing in the stuffing box, and thereby prevent the escape of fluid pressure through said stuffing box.

To the above purposes my invention consists of certain novel features of construction and arrangement of parts which will be hereinafter set forth, pointed out in the claims, and illustrated in the accompanying drawings, in which—

Figure 1 is a vertical section taken through the center of stuffing box and showing my improved truing and smoothing rings arranged therein; Fig. 2 is a detail section illustrating a modified form of one of the truing and smoothing rings; Fig. 3 is an elevation partly in section of one of the truing and smoothing rings; Fig. 4 is an edge view of one of the rings; Fig. 5 is a detail view looking against the inner surface of one of the sections of a ring constructed in accordance with my invention.

Referring by numerals to the accompanying drawings: 1 designates a piston rod or reciprocating shaft which is arranged to operate through a stuffing box 2, which latter is provided with the usual gland 3.

The smoothing and truing rings as contemplated by my invention and which occupy the annular chamber formed in the stuffing box 2, are formed of brass or analogous material, and each comprises a series of segmental sections 4 which, when properly united, form a complete ring, and each section being provided with a wide inner face or periphery 5, a narrow outer face or periphery 6, and with the inclined or beveled side faces 7. The inner faces or peripheries 5 of the ring sections 4 are provided with continuous grooves 8, or in some instances with the diagonally disposed cross grooves 9, and the sharp edges formed between the sides of these grooves and the inner faces of the ring sections, form cutting edges which engage the surface of the rod or shaft 1, to smooth and true the same as said rod or shaft reciprocates through the stuffing box. These grooves also serve the purpose of lubricant reservoirs, inasmuch as they receive and retain the lubricating oil applied to the surface of the piston rod or reciprocating shaft 1.

The adjacent ends of the ring sections 4 are beveled as designated by 10, and formed in the outer faces 6 of the ring sections are deep grooves 11 which, when the ring sections are fitted together, form a continuous deep groove, which is occupied by a pair of open spring rings 12, which normally exert a contracting effect upon the ring and thus cause the inner faces 5 of the sections of said ring to snugly bear against the surface of the piston rod or shaft 1.

Formed in the side faces 7 of each ring section 4 are screw-threaded apertures 13, which are adapted to receive the threaded end of a rod used for withdrawing said ring sections from the stuffing box when it is desired to renew the same or to renew the flexible packing used in the stuffing box.

The smoothing and truing rings utilized in the ends of a stuffing box are in construction substantially like the rings just described, with the exception that each of the sections of the end rings are formed with only one beveled or inclined side face 7, the opposite side face 7ª being perfectly straight and occupying a plane at right-angles to the planes occupied by the inner and outer faces 5 and 6 of said ring sections.

When positioned in a stuffing box the straight face 7ª of the innermost end ring lies directly against the inner end of the annular chamber within said stuffing box, while the straight face 7ª of the outer one of said rings bears against the inner end of the gland 3. In some instances a pair of the rings constructed as just described with the straight side faces 7ª may be fitted together within the stuffing box, as shown in Fig. 2, thus obtaining practically the same construction as where the rings are provided with two inclined or beveled side faces.

When the smoothing and truing rings are properly positioned in a stuffing box, the spring rings 12 hold the inner faces of the ring sections in close contact with the surface of the piston rod or reciprocating shaft, and when so held the external diameter of each ring is slightly less than the internal diameter of the annular chamber in the stuffing box, and thus each ring has sufficient space to expand slightly and give with any unevenness on the surface of the rod or shaft, and which unevenness will, in a short time, be worn down as a result of the smoothing action of the inner surfaces of the rings upon said rod or shaft. The spring rings 12 fit snugly within the grooves 11 and hold the ring sections together in proper shape to form a true ring and said ring sections are thus held against any side movement, and are only permitted to expand and contract.

The smoothing and truing rings constructed as herein described are applied to a stuffing box around the piston rod or shaft operating therethrough, as seen in Fig. 1, and sections 14 of flexible packing are fitted in the spaces between the smoothing and truing rings, and when the gland 3 is forced into the stuffing box, the inclined faces 7 and 7ª on the smoothing rings bear against the ends of the flexible packing rings, thus tightly compressing the same and forcing the inner surfaces or peripheries of said packing rings onto the surface of the rod or shaft 1, thus effecting a perfect packing for said rod or shaft, the surface of which is kept perfectly true and smooth as it reciprocates through the metal rings, the inner surfaces of which are grooved to form smoothing edges.

Smoothing and truing rings of my improved construction are very simple, easily applied for use, can be readily combined with any ordinary form of flexible packing, and in use maintain the surface of a piston rod or reciprocating shaft perfectly smooth and true.

I claim—

1. A smoothing and truing ring of the class described, composed of a series of segmental sections, the adjacent ends of which sections are beveled, the inner and outer peripheral faces of which sections are parallel and the side faces of said sections are uniformly tapered from the inner to the outer faces, and the inner and outer faces of each section being provided with grooves, and a spring ring seated in the grooves formed in the outer faces for holding said sections together.

2. The combination with a series of smoothing and truing rings arranged in a stuffing box, each ring composed of a series of segmental sections, the inner and outer faces of each section being parallel and provided with grooves, and the side faces of each section being uniformly tapered from its inner to its outer face, a split spring ring seated in the grooves formed in the outer face of the sections for holding said sections together, and flexible packing rings arranged between the smoothing and truing rings.

In testimony whereof, I have signed my name to this specification, in presence of two subscribing witnesses.

AUGUST H. FRANKE.

Witnesses:
M. P. SMITH,
E. L. WALLACE.